United States Patent Office 3,647,760
Patented Mar. 7, 1972

3,647,760
TERPOLYMERS OF AN N-VINYL URETHANE, AN ACRYLATE AND AN UNSATURATED NITRILE CARBONATE
Larry G. Wohlgemuth, Cherry Hill, N.J., and William H. Fritock, Glenolden, Pa., assignors to Atlantic Richfield Company, New York, N.Y.
No Drawing. Filed Jan. 14, 1970, Ser. No. 2,973
Int. Cl. C08g 22/00
U.S. Cl. 260—77.5 BB                    10 Claims

ABSTRACT OF THE DISCLOSURE

Self-curing terpolymers comprising the residues of an N-vinyl urethane, an acrylate and a terminally ethylenically-unsaturated nitrile carbonate are useful in the preparation of thermosetting coatings by baking, in the absence of cross-linking agents or catalysts. These thermosetting coatings may be incorporated into paint coating systems, electrocoating systems, fibers or adhesives.

---

An object of the present invention is to prepare solid terpolymers utilizing an N-vinyl urethane, an acrylate and a terminally ethylenically-unsaturated nitrile carbonate.

A further object of this invention is to prepare novel solid terpolymers comprising the residues of an N-vinyl urethane, an acrylate and a terminally ethylenically-unsaturated nitrile carbonate by polymerizing the monomers in the ratio of about 1 to 20 moles of an N-vinyl urethane to about 1 to 20 moles of an acrylate to about 1 to 20 moles of the nitrile carbonate. Preferred terpolymers are made from ratios of monomers in the range of about 1 to 5 moles of an N-vinyl urethane to about 1 to 5 moles of an acrylate to about 1 to 5 moles of the nitrile carbonate.

A further object of this invention is to prepare novel self-curing terpolymers capable of forming hard, transparent coatings on solid substrates by heating in the absence of cross-linking agents or catalysts. These coatings may be advantageously incorporated into paint coating systems, electrocoating systems, fibers or adhesives.

These objectives are accomplished by mixing the three monomers, an N-vinyl urethane, an acrylate and a terminally ethylenically-unsaturated nitrile carbonate, in various mole ratios and polymerizing to form substantially random addition terpolymers. The polymerization can be conducted at suitable temperatures, for instance, up to about 100° C. in bulk or solution systems, using free radical polymerization catalysts capable of polymerizing ethylenically-unsaturated monomers. Organic peroxides and peroxide esters, e.g. cumene hydroperoxide and tertiary butyl benzoyl hydroperoxide, azo compounds, e.g. 2,2′-azo bis(2-methyl propionitrile) and redox systems such as persulfate-bisulfite systems, e.g. potassium persulfate-sodium bisulfite, are useful polymerization catalysts for the preparation of these novel terpolymers.

The N-vinyl urethanes useful in the preparation of the terpolymers may be designated by the structural formula

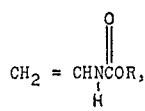

wherein R is a hydrocarbyl group of from 1 to about 12 carbon atoms. The preferred R groups are alkyl, cycloalkyl and aralkyl groups of from 1 to about 12 carbon atoms such as methyl, ethyl, isopropyl, n-butyl, 2-methylhexyl, octyl, dodecyl, cyclopropyl, cyclohexyl, cyclooctyl, p-methylbenzyl, benzyl and phenethyl. The R group may be substituted but is non-reactive under the polymerization conditions and is more preferably lower alkyl. The N-vinyl urethanes may be prepared by the known reaction of vinyl isocyanate and an alcohol at low temperatures, i.e., approximately 0° C., as disclosed, for example, on pages 74 and 75 of Polyurethanes, Chemistry and Technology, Part I, by Saunders et al. (1962).

The acrylates useful in the present terpolymers are a known class of compounds which can be prepared from acrylic acid and α-substituted derivatives thereof, such as methacrylic acid and α-chloroacrylic acid, and alcohols by conventional esterification methods. These acrylates may be designated by the structural formula

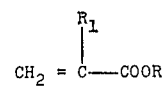

wherein $R_1$ is hydrogen, halogen or lower alkyl and R is as designated above regarding the N-vinyl urethanes. Again, the preferred R groups are alkyl, cycloalkyl and aralkyl from 1 to about 12 carbon atoms, e.g. lower alkyl. Exemplary suitable acrylates are n-butyl acrylate, ethyl methacrylate, benzyl acrylate and methyl α-chloroacrylate.

The ethylenically unsaturated nitrile carbonates are cyclic and may be designated by the formula

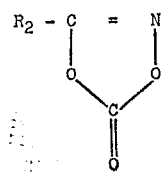

wherein $R_2$ is a polymerizable, terminally ethylenically-unsaturated hydrocarbon group of 2 to about 12 carbon atoms. The $R_2$ group is essentially hydrocarbonaceous; this term is interpreted to include hydrocarbons which are substituted with non-deleterious substituents or substituents which do not interfere with the polymerization, for example, chlorine or bromine. When free of aromatic groups, $R_2$ is preferably from 2 to about 8 carbon atoms and when containing aromatic groups, $R_2$ is preferably from 8 to about 12 carbon atoms. The $R_2$ group may be poly, for example, di-, as well as mono-ethylenically unsaturated as long as there is a terminal ethylenic group present. As specific examples of suitable $R_2$ groups are vinyl and vinylene hydrocarbon groups such as mono- and dialphaolefinic groups, e.g. vinyl, allyl, 1-pentenyl, 1-octenyl, 1,4-butadienylyl, isoprenyl, 3-vinyl cyclohexyl, and vinylene aromatic groups, e.g. p-vinyl phenyl, p-allyl phenyl, etc. Illustrative of the nitrile carbonates are, for example, acrylonitrile carbonate, p-vinyl benzonitrile carbonate and methacrylonitrile carbonate.

The ethylenically-unsaturated nitrile carbonates, useful as monomers herein, may be prepared by reacting the appropriate hydroxamic acid and phosgene. The suitable hydroxamic acids are represented by the structure

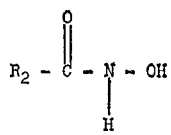

wherein $R_2$ is as defined above regarding the nitrile carbonates. The temperature for effecting the reaction of the hydroxamic acid and phosgene may vary, depending upon the particular hydroxamic acid; the reaction should, however, be conducted below the decomposition temperature of the nitrile carbonate product. The reaction temperature will often fall in the range of from −30° C., up to about 90° C., preferably up to about 50° C., when preparing the aromatic group containing nitrile carbonates and from −30° C. up to about 70° C., preferably up to about 40° C. when preparing the aliphatic nitrile carbonates. Ordinarily, the reaction will proceed readily at atmospheric pressure, but sub and superatmospheric pressure can be employed if desired. The phosgene can be in excess and a large excess of phosgene is particularly preferred. Normally, the reaction conditions are such that the reaction is conducted in the liquid phase, although in some cases, the hydroxamic acid reactant is in the solid state. Advantageously, the hydroxamic acid is first dissolved or slurried in an aromatic hydrocarbon, a halogenated aliphatic hydrocarbon or an oxygen-containing organic solvent. Illustrative of suitable solvents are phosgene itself and normally liquid organic materials such as chloroform, benzene, toluene, ethers, esters, furans, dioxanes, and the like. The preferred solvent is phosgene, the excess of which will partially dissolve the hydroxamic acid. The reaction is often completed in less than about 0.5 hour or in about 5 to 20 hours, depending upon the reaction temperatures; the completition is marked by a cessation in hydrogen chloride evolution. Normally, at least about 0.5 hour is required for the reaction to go to completion at temperatures which minimize side reactions. The reaction is usually quite rapid as the hydroxamic acid is dissolved.

The nitrile carbonate monomer can be recovered from the resulting solution by any desirable means, for instance, by first filtering the resulting solution to remove any unreacted starting materials and subjecting the filtrate to reduced pressure to remove unreacted acid chloride and inert solvent, if employed, and provide the nitrile monomer as a crude product. Alternately, prior to the filtering step, the solution can be cooled to crystallize out the product and the product then recovered as described. The crude product, which can be either crystalline or liquid, depending on the particular nitrile carbonate monomer prepared, contains small amounts of impurities high in chlorine content. A purer product, essentially chlorine-free, can be obtained by recrystallization techniques, as, for instance, from a suitable solvent such as ether, pentane, dichloromethane, carbon disulfide, ethyl acetate, acid chlorides and the like, and mixtures thereof.

A convenient method for obtaining an essentially chlorine-free nitrile carbonate monomer is by extraction or washing with a hydrocarbon solvent. Any normally liquid hydrocarbon solvent can be used for the extraction as, for instance, alkanes of 5 to 15 or more carbon atoms, aromatic solvents such as benzene, xylenes, toluene, chlorobenzene and the like. A minimum amount of solvent is employed in the extraction, the actual amount used being dependent upon the particular nitrile carbonate monomer feed selected. If desired, a combination of both the recrystallization and extraction methods can be used to obtain essentially chlorine-free monomer.

A preferred, alternative method of preparing the nonaromatic, terminally ethylenically-unsaturated nitrile carbonate adducts, represented by the structure given above, is by initially reacting hydroxylamine and an aliphatic lactone to form an aliphatic hydroxamic acid having a hydroxyl substituent on the aliphatic chain. The hydroxamic acid is then reacted with an excess of phosgene to convert the alcohol portion to a chloroformate and the hydroxamic acid portion to the cyclic nitrile carbonate. Reaction of the cyclic nitrile chloroformate and a strong base, for example, a strong tertiary amine, gives a nitrile adduct monomer having the desired polymerizable, ethylenically-unsaturated $R_2$ substituent.

The above reactions may be represented by the following general equations, wherein $R_2$ is alkylene of 1 to 3 carbon atoms, $R_3$ is hydrogen or hydrocarbyl, e.g., lower alkyl, and $n$ is 0 or 1:

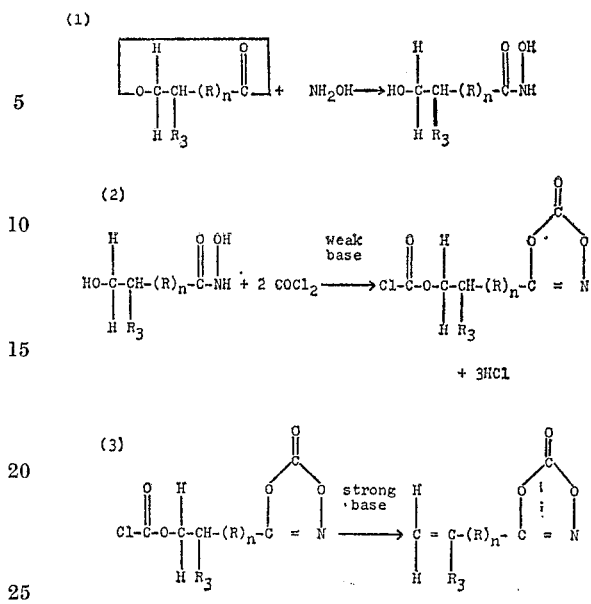

The aliphatic lactone reacted with hydroxylamine can have 4 to 7 members in the ring and may be substituted with, for example, lower alkyl groups, provided that the lactone contains two hydrogen atoms attached to a carbon atom which is adjacent to the carbon atom which forms an ester linkage with the ring oxygen. By way of explanation, in the formula:

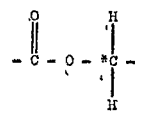

that carbon which is indicated by the asterisk (*) is considered the carbon atom which forms an ester linkage with the oxygen. Adjacent thereto must be another carbon atom (not shown) having at least one hydrogen atom attached to it. As examples of suitable aliphatic lactones, there may be mentioned, then, β-propiolactone, β-butyrolactone, β-valerolactone, caprolactone, etc.

The reaction of the lactone and hydroxylamine (Equation 1, above) can be effected by combining the reactants in the presence of a suitable solvent for the hydroxylamine, for example, tetrahydrofuran, ether, methanol, etc., at temperatures below the decomposition temperature of the hydroxylamine, say about −10 to 70° C., preferably about −5° C. to 30° C. The hydroxyaliphatic hydroxamic acid product can be precipitated from admixture with an organic solvent by the addition of, for example, chloroform, and recovered by filtration. Should the reaction be conducted in water, the product can be recovered by removal of water under reduced pressure.

In the reaction of phosgene and the hydroxy-aliphatic hydroxamic acid (Equation 2), the amount of the phosgene employed is preferably in excess of the stoichiometric amount. The reaction temperature should be kept below that at which the chlorine of the chloroformate reacts, for instance, at a temperature below about 15° C., for example, in the range of about −5 to 50° C. If it is desired to employ a solvent for the hydroxamic acid, solvents which do not react with phosgene, for example, hydrocarbon solvents, chlorinated hydrocarbons, etc., should be employed. To hasten the reaction of the hydroxy-aliphatic hydroxamic acid and phosgene, a weakly basic material which is unreactive towards the chloroformate product, for instance, dimethylaniline, may be added to combine with the HCl produced in the reaction and provide a substantial absence of free HCl in the reaction mixture. An excess of the basic material should be avoided since it later is removed from the product. After removal of volatiles, for example, excess phosgene, solvent, etc., the desired cyclic nitrile chloroformate can be recovered.

Decarboxylation-dehydrohalogenation of the cyclic nitrile chloroformate to give a cyclic nitrile adduct monomer having the desired polymerizable, ethylenically-unsaturated aliphatic substituent (Equation 3) can be effected by treating the cyclic nitrile chloroformate with a strong teritary aliphatic amine such as triethylamine. The exothermic reaction is conducted at a rate such that a temperature preferably in the range of about 20 to 40° C. is maintained. The reaction mixture is separated by, for example, washing with water to remove the amine hydrochloride and dried. The desired cyclic nitrile adduct monomer can be recovered by distillation.

The following examples will serve to illustrate the preparation of the polymerizable nitrile carbonate monomers, but are not to be considered limiting:

EXAMPLE I

Preparation of p-vinylbenzonitrile carbonate

A solution of 12 g. (0.74 mole) of p-vinylbenzohydroxamic acid and 100 cc. (large excess) of phosgene in 75 cc. ether and 25 cc. tetrahydrofuran was allowed to stir at room temperature for half an hour. The reaction mixture was filtered and the solvents removed under reduced pressure. There resulted, after trituration with pentane, 9.8 g. (70%) of p-vinylbenzonitrile carbonate, M.P. 70–72° C.

Analysis.—Calcd. for $C_{10}H_7NO_3$ (percent): C, 63.49; N, 7.41; O, 25.37. Found (percent): C, 64.45; H, 3.99; N, 7.08.

The infrared spectrum of the product ("Nujol" mull) showed the typical nitrile carbonate absorptions.

EXAMPLE II

Preparation of acrylonitrile carbonate (A) Preparation of β-hydroxy-propiohydroxamic acid.—To a 3 liter, 3 necked, fluted, round bottom flask equipped with stirrer, dropping funnel, condenser and thermometer, containing 800 ml. of methanol and 208.5 g. (3 moles) of hydroxylamine hydrochloride, were added 303 g. (3 moles) of triethylamine dropwise at room temperature. The slurry was stirred constantly. After the addition was completed the temperature was taken down to 0° C. and maintained there while 216 g. (3 moles) of β-priopiolactone was added dropwise. The reaction mixture was then allowed to equilibrate to room temperature and β-hydroxypropiohydroxamic acid was precipitated out by adding 2400 ml. of chloroform. After standing in the refrigerator for some hours, the crystalline product was filtered off, dried at reduced pressure, and 240 g. (77% yield) of β-hydroxypropionhydroxamic acid, identified by I. R. analysis and melting point was recovered.

(B) Preparation of 2-(nitrile carbonato) ethyl chloroformate.—The set-up described in step I containing 900 ml. of chloroform and 150 g. (1.42 moles) of β-hydroxypropiohydroxamic acid, was charged with 350 g. (3.56 moles) of phosgene. The temperature was kept at 0° C. throughout the reaction. A dropwise addition of dimethylaniline followed with all of the μ-hydroxypropiohydroxamic acid being dissolved and a colorless solution obtained.

The reaction mixture was allowed to equilibrate to room temperature and the excess phosgene was removed at reduced pressure. After washing four times with ice-water and drying by filtering through a bed of magnesium sulfate, the excess solvent was removed and 246 g. (90% yield) of 2-(nitrile carbonato) ethyl chloroformate was obtained.

The product was identified by its characteristic I. R. absorbtion at 5.35, 5.45 and 5.62, and by elemental analysis—Calculated (percent): C, 31.10; H, 2.10; N, 7.2; Cl, 18.3. Obtained (percent): C, 31.27; H, 2.45; N, 6.45; Cl, 18.5.

(C) Preparation of acrylonitrile carbonate.—A 2-liter, fluted, round bottom flask equipped with stirrer, condensor, dropping funnel and thermometer, containing 233 g. (1.2 moles) of 2-(nitrile carbonato) ethyl chloroformate and 2.33 g. of p-methoxyphenol as an inhibitor, was treated with 109.7 g. (10.8 moles) of triethyl amine. The addition was carried out dropwise and at room temperature. The reaction mixture was then allowed to stand for several hours and was then washed with ice-water (3 times), dried over magnesium sulfate and distilled at reduced pressure to yield a liquid product having a boiling point of 51° C. at 4 mm. Hg pressure. The product, 85 g. of which was obtained (69% yield), was identified by the characteristic I.R. absorbtion of 5.35, 5.45 and 9.65μ and by elemental analysis.—Calculated (percent): C, 42.48; H, 2.65. Obtained (percent): C, 42.50; H, 2.90.

The following are non-limitative examples indicating specific methods of preparation of the terpolymers and coatings prepared therefrom.

EXAMPLE III

A three neck flask equipped with an agitator, reflux condenser and nitrogen inlet tube was charged with 4 ml. of toluene, 2 ml. (0.014 mole) of n-butyl (N-vinyl carbamate), 2 ml. (0.014 mole) of n-butyl acrylate and 2 ml. (0.023 mole) of acrylonitrile carbonate. After deaerating the reaction mixture for one-half hour with nitrogen 8 mg. of 2,2′-azo bis(2-methyl propionitrile) was added as catalyst. While still under nitrogen purge, the reaction mixture was stirred at approximately 85° C., for one hour and then an additional 8 mg. of the azo catalyst was added. After 2 hours, the reaction mixture had thickened considerably and after 5 hours, the reaction mixture had gelled to the extent that no further stirring was possible with the magnetic stirring apparatus. Addtion of more toluene caused a non-sticky gel to fall out of solution. The gel was removed from the pot in mass and dissolved in methyl ethyl ketone and reprecipitated from n-hexane. After drying the polymer was a fluffy, white solid having a softening point of 80° C., and melting point of 120° C. When subjected to a temperature above 180° C., the polymer hardened.

Elemental analysis of the polymer disclosed weight percent carbon as 54.6, weight percent hydrogen as 8.1 and weight percent nitrogen as 8.54. A theoretical calculation of 1:1:1 polymer disclosed weight percent carbon as 56.3, weight percent hydrogen as 7.3 and weight percent nitrogen as 7.3.

EXAMPLE IV

A coating of the terpolymer of Example III was prepared in the following manner. 0.5 gram of the terpolymer was dissolved in 0.5 gram of methyl ethyl ketone and this solution was applied to a clean glass using a 4-mil bird applicator. The treated glass plate was then baked for one-half hour at 180° C. The flash off time allowed for the coating was 10 minutes due to the high volatility of the methyl ethyl ketone solvent. Upon cooling, a hard, brittle and transparent coating was present upon the glass plate.

We claim:
1. Solid, random addition terpolymers of
(A) an N-vinyl urethane having the formula

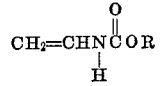

(B) an acrylate having the formula

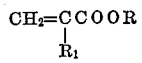

and (C) a terminally ethylenically-unsaturated cyclic nitrile carbonate of the formula

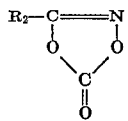

wherein R is a hydrocarbyl group of up to about 12 carbon atoms, $R_1$ is hydrogen, halogen or lower alkyl and $R_2$ is a terminally ethylenically-unsaturated hydrocarbyl group of 2 to about 12 carbon atoms, said (A), (B) and (C) being polymerized in the ratio of about 1 to 20 moles of (A) to about 1 to 20 moles of (B) to about 1 to 20 moles of (C).

2. Terpolymers of claim 1 wherein R is lower alkyl.

3. Terpolymers of claim 1 wherein (A), (B) and (C) are polymerized in the ratio of about 1 to 5 moles of (A) to about 1 to 5 moles of (B) to about 1 to 5 moles of (C).

4. Terpolymers of claim 2 wherein (A), (B) and (C) are polymerized in the ratio of about 1 to 5 moles of (A) to about 1 to 5 moles of (B) to about 1 to 5 moles of (C).

5. Terpolymers of claim 4 wherein (A) is n-butyl (N-vinyl carbamate), (B) is n-butyl acrylate and (C) is acrylonitrile carbonate.

6. A solid substrate having a coating of a terpolymer of claim 1.

7. A solid substrate having a coating of a terpolymer of claim 2.

8. A solid substrate having a coating of a terpolymer of claim 3.

9. A solid substrate having a coating of a terpolymer of claim 4.

10. A solid substrate having a coating of a terpolymer of claim 5.

References Cited
UNITED STATES PATENTS 2,748,103   5/1956   Priest _____ 260—77.5 BB M. J. WELSH, Primary Examiner U.S. Cl. X.R.

117—124 E; 260—32.8 N

PO-1050
(5/69)

UNITED STATES PATENT OFFICE
CERTIFICATE OF CORRECTION

Patent No. 3,647,760      Dated March 7, 1972

Inventor(s) Larry G. Wolgemuth et al

It is certified that error appears in the above-identified patent and that said Letters Patent are hereby corrected as shown below:

Inventor's name should read LARRY G. WOLGEMUTH not Larry G. Wohlgemuth.

Signed and sealed this 11th day of July 1972.

(SEAL)
Attest:

EDWARD M. FLETCHER, JR.      ROBERT GOTTSCHALK
Attesting Officer      Commissioner of Patents